United States Patent [19]

Ueno et al.

[11] Patent Number: 5,112,689

[45] Date of Patent: May 12, 1992

[54] COMPOSITE PARTICLE

[75] Inventors: Tasaburo Ueno, Osaka; Hisaki Tanabe, Kyoto; Ryozo Takagawa; Yoshio Eguchi, both of Osaka; Koichi Tsutsui, Kyoto; Naoya Yabuuchi, Osaka, all of Japan

[73] Assignee: Nippon Paint Co., Ltd., Osaka, Japan

[21] Appl. No.: 447,511

[22] Filed: Dec. 7, 1989

[30] Foreign Application Priority Data

Dec. 7, 1988 [JP] Japan .................. 63-310492

[51] Int. Cl.$^5$ .............................................. B32B 9/01
[52] U.S. Cl. ........................................ 428/407; 428/1; 428/403; 252/299.61; 252/299.66; 252/299.68; 525/437
[58] Field of Search .................. 428/1, 402, 407, 403; 525/437; 252/299.66, 299.61, 299.68

[56] References Cited

U.S. PATENT DOCUMENTS

| | | | |
|---|---|---|---|
| 4,169,848 | 10/1979 | Komar et al. | 525/437 |
| 4,195,916 | 4/1980 | Coates et al. | 428/1 |
| 4,414,365 | 11/1983 | Sugimoto et al. | 525/437 |
| 4,710,547 | 12/1987 | Urya et al. | 525/437 |
| 4,728,698 | 3/1988 | Isayev et al. | 525/437 |
| 4,835,244 | 5/1989 | Heitz et al. | 525/437 |
| 4,842,380 | 6/1989 | Takayanagi et al. | 428/1 |
| 4,892,926 | 1/1990 | Suenaga et al. | 525/437 |
| 4,904,752 | 2/1990 | Kanoe et al. | 428/1 |
| 4,915,867 | 4/1990 | Morita et al. | 252/299.66 |
| 4,956,448 | 9/1990 | Morris et al. | 525/437 |
| 4,959,450 | 9/1990 | Morris et al. | 525/437 |
| 4,988,460 | 1/1991 | Morita et al. | 252/299.66 |

FOREIGN PATENT DOCUMENTS 2080820 2/1982 United Kingdom ........... 252/299.66

*Primary Examiner*—Merrell C. Cashion, Jr.
*Assistant Examiner*—Robert Follett
*Attorney, Agent, or Firm*—Wenderoth, Lind & Ponack

[57] ABSTRACT

The invention relates to a composite particle comprising 2 to 98% by weight of a base resin having softending point of $-10°$ to $120°$ C. and a number average molecular weight of 600 or more and 98 to 2% by weight of an anisotropic crystalline polymer having a phase transition point of $60°$ to $230°$ C. and a number average molecular weight of 600 to 10,000 and capable for forming an anisotropic molten phase, the polymer having the specific structure in which a repeating unit of the formula:

$$A-X-B \qquad (I)$$

(wherein 100 to 50 mol % of A stands for defined mesogenic group, 0 to 50 mole % of A is p-phenylene, m-phenylene or trans-1,4-cyclohexylene, B is a defined spacer group, and X is ester bond, carbonate bond, amide bond, urethane bond or urea bond, and a repeating unit of the formula:

$$R \qquad (II)$$

in which R stands for bivalent to hexavalent hydrocarbon residue, are connected, in any successive orders and in a weight ratio of (I)/(II)=99.9/0.1 to 60/40, with each other through ester bond, carbonate bond, amide bond, urethane bond or urea bond, and end portions are occupied by a functional group as hydroxyl, carboxyl and the like. The composition particle is useful as powder coating, dry toner and the like.

4 Claims, No Drawings

COMPOSITE PARTICLE

FIELD OF INVENTION

The present invention relates to a novel composite particle and more particulary, a composite particle being specifically useful in an application where both flowability and blocking resistance of particles are strongly desired as in a powder coating, dry toner for developing static latent images and the like.

BACKGROUND OF THE INVENTION

Resinous particles for powder coating are usually prepared by mixing a thermoplastic or thermosetting resin having comparatively low softening point, pigment and other additives, kneading the mixture at an elevated temperature,cooling the mixture to solidify to mass and pulverizing the same.These particles should not yield fused mass or hard cake at a storage time and should give a smooth coating, when applied and baked, having no pinholes and seedings. Therefore, blocking resistance and improved flowability are essential for the particles to be used in powder coating. Heretofore, in order to have an improved flowability of powder coating, attempts have been made to use a base resin having relatively lower molecular weight or lower glass transition point. However, with the increase in flowability of such powder, there is a tendency that blocking resistance or film properties are proportionally lowered and thus, it is believed to be very difficult to have a well balanced, abovementioned two conflicting properties. Under the circumstances, while taking a serious view of the fundamental properties of a resin, people tax their ingenuities to design a resin and powder coating so as to get the possible maximum flowability while ensuring the least blocking resistance and accetable film properties. In another technical field of dry toner which is used for the development of static latent images in an electrophotography, electrostatic recording and the like, is still continuing studies on a developing powder comprising a resin having a lower softening point and a color pigment, which is suitable for use with a low temperature fixing roll. However, it is likewise very difficult to satisfy the both flowability and blocking resistance properties at the same time, and an ideal toner fulfilling the requirements has never been obtained up to the present days. It is, therefore, an object of the invention to provide a novel class of composite polymer particles which are specifically useful in an application where well balanced flowability and blocking resistance are highly desired as in powder coating, dry toner used in an electrophotography, electrostatic recoading and the like.

SUMMARY OF THE INVENTION

According to the present invention, the abovemention object can be attained with a composite particle comprising 2 to 98% by weight of a base resin and 98 to 2% by weight of an anisotropic crystalline polymer, the former being a high molecular weight polymer having a softening point of −10° to 120° C. and having a number average molecular weight of 600 or more, and the latter being a polymer capable of forming an anisotropic molten phase, having a number average molecular weight of 600 to 10,000 and a phase transition point of 60° to 230° C. and having the structure in which a repeating unit (I) of the formula (I)

wherein 100 to 50 mol % of A stands for a mesogenic group selected from the group consisting of a polyphenylene in which 2 or more benzene rings are directly connected with each other at their respective para-position, a polyphenylene in which 2 or more benzene rings are mutually connected with each other at the respective para-position through azo, azoxy, ester or transvinylene bond, 2,6-naphthylene and 2,6-anthrylene and their ring-substituted derivatives, the remaining 0 to 50 mol % of A stands for p-phenylene, m-phenylene or trans-1,4-cyclohexylene group; B is a spacer group represented by the formula:

$-(CH_2)_n-$ or the formula:

$-(CH_2CH_2O)_m CH_2CH_2-$ in which n is an integer of 2 to 20 and m is an integer of 1 to 19; and X represents ester bond, carbonate bond, amide bond, urethane bond or urea bond, and a repeating unit (II) of the formula:

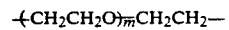

in which R stands for bivalent to hexavalent hydrocarbon residue having 2 to 12 carbon atoms, which may include up to 4 hydroxyl, sulfonic acid, carboxyl, amino, pyridinium or quaternary ammonium groups, are connected in any successive orders and in a weight ratio of (I) / (II) = 99.9/0.1 to 60/40, each other through ester bond, carbonate bond, amide bond, urethane bond or urea bond, and whose end portions are occupied by at least one functional group selected from the group consisting of hydroxyl, carboxyl, sulfonic acid, primary amino, secondary amino, tertiary amino, quaternary ammonium, pyridinium and phosphoric acid groups.

Preferable embodiments of the invention Thus, in the present invention, to a polymer particle compossed of a high molecular weight base resin, a particular type of anisotropic crystalline poymer is included, whereby providing a novel composite polymer particle which is excellent in blocking resistance in storage at room temperatures and has an excellent flowability in a heatmelt at an elevated temperature which is higher than a phase transition temperature of the crystalline polymer used.

Therefore, such novel composite particle is very useful asa powder coating and as a dry toner to be used in a development of static latent images.

In this invention, as stated hereinabove, a particular anisotropic crystalline polymer is present in a conventional particle to be sued as a powder coating or as a dry toner. At that time, the anisotropic crystalline polymer may be uniformly or even ununiformly present on the surface of said powder coating or toner particle (hereinafter merely referred to as particle), or maldistributed at the local of partcle surface, or when used in a considerably larger quantity, may be uniformly or ununiformly included and distributed in the inside of said particle.

The particle per se may be of known type, and in the case of powder coating, such particle may be composed of a base resin having a relatively lower softening point as polyester resin, expoxy resin, acrylic resin and the like, having a softening point of −10° C.−+120° C., a color pigment as Ciquacia red, phthalocyanine bue and the other organic pigments, titanium oxide, iron oxide, red oxide, carbon black and other inorganic pigments, and optional hardener and other various additives. In the case of dry toner, the particle may be composed of a base resin, preferably having a low softening point of $-10°$ $-120°$ C., for enabling adopting a low fixsing temperature, as, for example, polystyene, styreneacrylate copolymer, styrene-methacrylate copolymer, styreneacrylonitrile copolymer, styrene-butadiene copolymer, styrene-maleic anhydride copolymer, polyethylene, polypropylene, poyester, polyurethane, epoxy resin, polyamide and the like; a colorant including such pigments as carbon black, phthalocyanine blue, aniline blue, nigrosine, ultramarine blue, chrome yellow, quinoline yellow, Du Pont oil red, Rose Bengale and the like, and dyestuffs; and other optional additives as antistatic agent (e.g. chrome containing dyestuff, nigrosine, polyamine, quaternary ammonium compound and the like), release agent (e.g. polyethylene wax, polypropylene wax, silicone oil and the like), magnetic material (e.g. magnetite, ferrite and the like), and other functional materials (e.g. silica, alumina and the like).

As the most characteristic feature of this invention, the abovementioned base resin is used in the combination with hereinunder stated anisotropic crystalline polymer. That is, the anisotropic crystalline polymer used in this invention is a polymer capable of forming an anisotropic molten phase, having a number average molecular weight of 600–10,000 and having the structure in which a repeating unit (I) of the formula:

A—X—B wherein 100 to 50 mol % of A stands for a mesogenic group selected from the group consisting of a polyphenylene in which 2 or more benzene are directly connected with each other at their respective para-position, a polyphenylene in which 2 or more benzene rings are mutually connected with each other at the respective para-position through azo, azoxy, ester or trans-vinylene bond, 2,6-naphthylene and 2,6-anthrylene and their ring-substituted derivatives, the remaining 0 to 50 mol % of A stands for p-phenylene, m-phenylene or trans-1,4-cyclohexylene group; B is a spacer group represented by the formula:

or the formula:

in which n is an integer of 2 to 20 and m is an integer of 1 to 19; and X represents ester bond, carbonate bond, amide bond, urethane bond or urea bond, and a repeating unit (II) of the formula:

R in which R stands for bivalent to hexavalent hydrocarbon residue having 2 to 12 corbon atoms, which may include up to 4 hydroxyl, sulfonic acid, caboxyl, amino, pyridinium or quaternary ammonium groups, are connected in any successive orders and in a weight ratio of (I)(II)=99.9/0.1–60/40, each other through ester bond, carbonate bond, amide bond, urethane bond or urea bond, and whose end portions are occupied by at least one functional group selected from the group consisting of hydroxyl, carboxyl, sulfonic acid, primary amino, secondary amino, tertiary amino, queternary ammonium, pyridinium and phosphoric acid groups.

Such polymer may be easily prepared in the same way customarily used in the preparation of a high molecular weight compound, with defined amounts of raw materials suitable for introducing said A, B and R components, and for example, in the case of polyester, alcohol and acid components.

In the present polymer, the abovementioned unit (I) wherein a mesogenic group (A) having a planar structure and being of relatively rigid nature and a spacer group (B) having a flexible property are connected with each other through ester bond or other bond represented by X, and unit (II)which is a hydrocarbon residue (R) selected for the purpose of controlling film properties, that is liquid crystal unit (I) and film property controlling unit (II), are connected with each other in any successive orders and contained each in wellbalanced quantity Since the polymer has a phase transition point of about 60°–230° C. and shows a sudden phase transistion from solid to low viscous liquid at a defined pempeature in heating, it is excellent in flowability at an elevated temperature. When it is used as a thermosetting resin, a non-crystalline, clear, hard coating with excellent film appearance can be obtained therewith. On the basis of these findings, the inventors have already applied for patents on the polymer themselves and preparation thereof (Japanese Patent Application Sho 62-256488 and ibid 62-256489).

Speaking of the constituting component (A) of the present anisotropic crystalline polymer, 100 to 50 mol % of said (A) must be a mesogenic group selected from the group consisting of a polyphenylene group in which 2 or more benzene rings are directly connected with each other at their respective para-position, as, for example, 4,4'-biphenylene

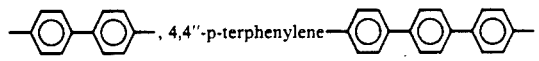

and the like; a polyphenylene group in which 2 or more benzene rings are mutually connected with each other at their respective para-position through azo, azoxy, ester or trans-vinylene bond, as, for example,

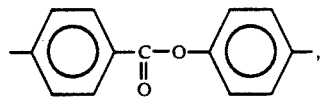

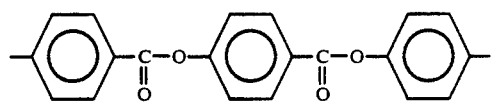

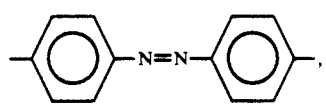

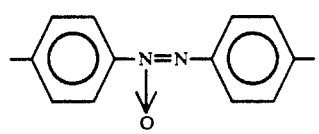

-continued

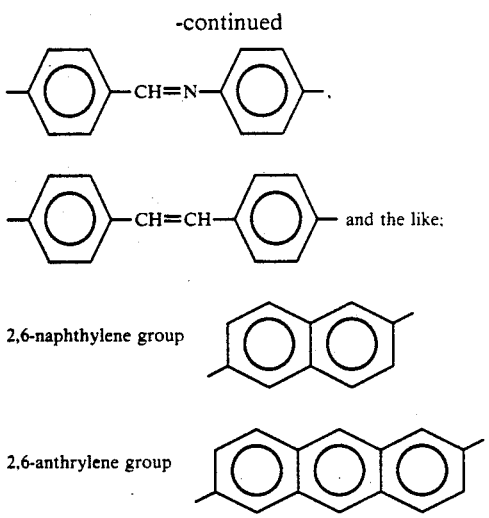

2,6-naphthylene group 2,6-anthrylene group and their nuclear-substituted derivatives, and the remaining 0–50 mol % is selected from the group consisting of p-phenylene, m-phenylene and trans-1,4-cyclohenylene.

As the starting material for said masogenic (A) component, it is preferred to use the compounds having the abovementioned structures whose free ends are occupied by either member of caboxyl group, carboxylic ester group, acid chloride group, hydroxyl group and acetyl group. For the remaining (A) component other than mesogenic group, it is likewise preferred to use the compounds having p-phenylene, m-phenylene or trans-1,4-cyclohexylene structure, whose free ends are occupied by either one of carboxyl group, hydroxyl group, acetyl group, carboxylic ester group, acid chloride group, isocyanate group and amino group. The spacer component (B) may be represented by either one of the formulae:

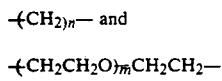

This spacer component (B) should be connected to the aforesaid (A) component, or the neighboring A—X—B unit, or R unit, through ester bond, carbonate bond, amide bond, urethane bond or urea bond. Therefore, the starting materials to be use for the introduction of said (B) should preferably have end groups selected from hydroxyl, carboxyl and other functional groups suitable for giving the desired connecting bond.

In the anisotropic crystalline polymer used in the present invention, is included a repeating unit R besides the repeating unit of A—X—B, in a weight ratio of (A—X—B)/R = 99.9/0.1–60/40.

This unit R is a bivalent to hexavalent hydrocabon residue having 2 to 12 carbon atoms, selected from aliphatic, aromatic or alicyclic hydrocarbon, and optionally having up to 4 hydroxyl groups, carboxylic groups, amino groups, pyridinium groups or quaternary ammonium groups. This R unit should also be connected to the neighboring A, B or R unit through either one of ester bond, carbonate bond, amide bond, urethane bond and urea bond. Examples of R donators are neopentylglycol, hydroxy pivalic acid, cyclohexane 1,4-diol, trimethylol ethane, trimethylol propane, pentaerythritol, sorbitol, phthalic anhydride, trimellitic anhydride, pyromellitic anhydride, tetrahydrophthalic anhydride, p-hydoxy benzoic acid, hexahydrophthalic anhydride, 3-methyl hexahydro phthalic acid, 4-methyl hexahydro phthalic acid and the like. These are only typical examples of employable R donators, and the hydroxyl group contained may be replaced by isocyanate group, amino group or other functional group as desired. It is, of course, possible to use a hydrocarbon having a combination of 2 or more functional groups.

In this invention, various anisotropic crystalline polymers are provided by selecting appropriate A, B or R donators and selecting the reaction with particular compound having appropriate end functional group as hydroxyl, carboxyl, sulfonic acid, primary amino, secondary amino, tertiary amino, quaternary ammonium, pyridinium or phosphric acid group.

The anisotropic crystalline polymer used in this invention is thus characterized by having (1) a specific structure in which the first repeating unit (I) comprising a comparatively rigid mesogenic group (A) having a planar structure connected with a flexible spacer group (B) through X bond and the second repeating unit (II) comprising a hydrocarbon residue (R) which is contributive to the control of film properties, are contained in each defined amount, (2) an end functional group, (3) a number average molecular weight of 600–10,000 and (4) a phase transition temperature of about 60°–230° C., and (5) capable of forming an anisotropic molten phase. In this invention, is provided a composite particle comprising the abovementioned anisotropic crystalline polymer, i.e. a polymer having such phase transition point and capable of forming an anisotropic molten phase, and a base resin.

As already stated, the particle to which the present anisotropic crystalline polymer is to be included is the same one as used in conventional powder coating or the conventional dry toner itself.

Any of the known methods may be used for the introduction of said polymer in such particle. The most simple and easiest way is to spread microparticles containing said anisotropic crystalline polymer over said particle. In another method, the particle may be coated by various means with a molten solution of said anisotropic crystalline polymer. In an additional method, a base resin and the present anisotropic crystalline polymer are heat-melted or dissolved in a solvent and thus obtained solution is dispersed in water and then subjected to drying or spray-drying to obtain the present composite particles. Alernatively, the constituting materials for the base resin are polymerized in the presence of anisotropic crystalline polymer having an ionic group as carboxyl group, sulfonic acid group, amino group, quaternary ammonium group, pyridinium group or their salts, in an emulsion polymerization or suspension polymerization, to obtain the present composite particles each comprising base resin particle whose surface layer contains the present anisotropic crystalline polymer.

The present composite particle may also be prepared by using precipitate, deposition means or surface polycondensation means.

Furthermore, when a comparatively larger quantity of anisotropic crystalline polymer is used, the present composite partcle may be offered by heat-melting the base resin and present anisotropic crystalline polymer with other optional ingredients, cooling the mass and pulverizing the same. As already stated, the important usages of the present composite particle which will make the best of the properties thereof are powder coating and dry toner used in the development of latent images, and therefore, they shall be explained in more minutely hereinunder.

In the case of powder coating, the base resin may preferrablybe a polyester resin which is excellent in flexibility, an acryl resin which is excellent in weather resistance, an epoxy resin which is excellent in adhesion property, and a vinyl chloride resin for a thermophastic powder coating.

Softening point of such resin is preferably in a range of $-10°-120°$ C. If the softening point is two low, it is unable to have the powder coating being suitable for practical use, and if it is too high, the desired finishing appearance can never be obtained due to undesired loss in flowability. The molecular weight of such resin should preferably be in a range of 600-10,000. This is because, if the molecular weight is less than 600, it is unable to obtain the desired properties of coating use resin, and if it exceeds over the upper limit of 100,000, there is a tendency that flowability of the resin will be excessively lowered because of undesired increase in viscosity of the resin. Usually, a color pigment is added to the base resin and however, in some cases, this may be omitted. When used, the amount of pigment should preferably be limitted to 80 % or less of the total resin. If the pigment amount exceeds over said limit, there will be undesired increase in structural viscosity, resulting a face roughening of the coating.

In a preferred embodiment, the base resin should be of thermosetting nature. For this end, a hardening agent as blocked isocyanate, amino plast resin and the like is compounded with the resin or the base resin itself is selected from thermosetting type resins.

In the most preferable embodiment, mutually reactive functional groups, as, for example, OH and NCO, COOH and epoxy group and the like, each is carried with each base resin and anisotropic crystalline polymer and in this way, the whole system is designed to be of thermosetting nature. When the coating is subjected to baking at an elevated temperature which is higher than the phase transition point of the anisotropic crystalline polymer, as, for example $100°-250°$ C., the crystalline property of said polymer is completely lost out due to the reaction of said polymer at the baking stage, resulting the desired tough coating. Therefore, the phase transition temperature of the anisotropic crystalline polymer should preferably be in a rang of $80°$ to $230°$ C., which is a little lower than the baking temperatures used. If the phase transition temperature is lower than $80°$ C., there will often cause trouble in storage stability, and if it exceeds over $230°$ C., energy efficiency on baking is not so good and there will produce additional troubles of side-reaction and generation of volatile sustances and the like.

As to the number average molecular weight of said anisotropic crystalline polymer, it is preferred to be in a range of 600-10,000 for the purpose of obtaining the desired blocking resistance and desired flowability. If the molecular weight is less than 600, it is unable to get the desired properties and distinct phase transition of the said polymer, whereas if it exceeds over 10,000, there is a tendency that flowability will be undesirably lowered.

In the most preferable embodiment of this invention, to give the desired thermosetting property to the powder coating, it is highly desired to make the anisotropic crystalline polymer carry with a functional group as, for example, hydroxyl group, caboxyl group, epoxy group and the like and the binder resin with the corresponding reactive functional group as, for example, isocyanate group, hydroxyl group, epoxy group, carboxyl group and the like. Furthermore, in order to get a hardening of the whole coating, it is preferred to use a separate hardening agent as blocked polyisocyanate, amino plast resin and the like.

In the case of powder coating, as the compounding ratios of these components, it is desired that 98-40 % by weight of the base resin is combined with 2-60 % by weight of anisotropic crystalline polymer, and the hardening agent is selected in a range of 0-30 % by weight of the total resin and the color pigment in a range of 0-80 % by weight of the total resin. This is because, in the combination of said anisotropic crystalline polymer and base resin, at least 40 % by weight of the base resin is required for obtaining the desired properties of the formd coating and at least 2 % by weight of anisotropic crystalline polymer is required for the desired blocking resistance fo powder coating. When used, the maximum content of hardening agent should be set in 30 % by weight of the sum of the anisotropic crystalline polymer and base resin, for curing purpose. Even if the said amount is inrcreased to more than 30 % by weight, there are no additional effects in respects of both curing and on film properties.

Excess amounts of color pigment will cause undesired increase in structural viscosity of coating composition, resulting face roughness of coating. Therefore, the maximum content of color pigment should be limitted to 80 % by weight of the total resin.

The present powder coating is made up of composite particles each comprising particle having an average diameter of 1-50 and comprising a base resin, an optional hardening agent, a colorant and other additives, to which the present specific anisotropic crystalline polymer is included Such powder coating may be prepared in various ways : For example, when the compounding ratis of said crystalline polymer is comparatively high, the abovementioned various raw materials are heat-melted together and the solidified mass is subjected to pulverization to obtain the intended composite particles. However, in general, the following methods may be advantageously use.

1) A method for prepering composite particles comprising mixing constituting materials for hydropholic powder coating with an anisotropic crystalline polymer having a surfactant property, heat-melting or dissolving the mixture in a solvent, and dispersing the melt or solution as emulsion in water under vigorous stirring 2) A method comprising adding, into a hot solution of anisotropic crystalling polymer in a solvent, powder coating prepared from the raw materials which are insoluble in said solvent, and allowing to cool to precipitate the crystalline polymer on the surface of respective powder particle.

3) A method for spreading or adhering anisotropic crystalline polymer microparticles to powder coating particle by means of static electrification or physical embedding. Besides the above, it is also possible to dissolve the required raw materials into a solvent and obtain microparticles by spray-drying means, or to make emulsion of binder resin by using anisotropic crystalline polymer having a surfactant property as an emulsifier in an aqueous medium.

Among them, particular preference is given to the method wherein anisotropic crystalline polymer microparticles are spreaded on the surface of respective powder coating particle. At that time, the following procedures are advantageously used.

In the first place, a common powder coating is prepared in a convention way. That is, the constituting components of base resin, color pigment, hardening agent and the like are heat-melted in a kneading machine as mixer, extruder, heat roll and the like, and after cooling, the solidified mass is pulverized by using atomizer, jet-mill and the like and slived. Alternatively, the constituting materials are dissolved or dispersed in an organic solvent and then thus obtained solution or dispersion is subjected to spray-drying and subsequent shieving.

Separately, is prepared microparticles containing an anisotropic crystalline polymer (I) and having an average diameter of $0.02-1\mu$ as follows. At that time if desired, an additiional resin (II) customarily used in the preparation of powder coating as acryl resin, epoxy resin, polyester resin and the like may be used together.

(1) A method comprising dispersing the abovementioned resin (I) or a mixture of resin (I) and (II) in an emulsion form in water in the presence of sufactant and/or water soluble dispersion stabilizer, optionally filtering and washing, and subjecting to drying.

(2) A method comprising dispersing the crystalline polymer (resin I) bearing ionic group as tertiary amino group, quaternary ammonium group, carboxyl group, sulfonic acid group and the like, previously neutralized if desired, in water, filtering, washing and drying (3) A method comprising effecting emulsion polymerization of monomer mixture for resin (II) in water and in the presence of crystalline polymer (Resin I) bearing ionic group as tertiary amino group, quaternary ammonium group, carboxyl group, sulfonic acid group and the like. Mixing of thus obtained microparticles and powder coating particles may be advantageously carried out by using any one of the following.

(1) Powder coating particles are dispersed in water and added with a water dispersion of microporticles separately prepared, and thus obtained mixture is stirred, filtered and dried.

(2) Powder coating particles and microparticles are directly mixed together in a super mixer, Henshel mixer and the like.

(3) Powder coating particles and microparticles are mixed together,in Hybritizer, ball-mill and the like to put the microparticles in the respective powder coating paricle. In either method, one may obtain the present composite particles each comprising powder coating particle on which surface the present anisotropic crystalline polymer is present and being useful as powder coating.

The most preferable powder coating of this invention comprises composite particles having an average particle diameter of 1 to $50\mu$, each comprising powder coating particle on which surface or in which surface layer a quantity of microparticles containing 2-100 wt % anisotropic crystalline polymer with a phase transition point of $60°-230°$ C. and having an average particle diameter of $0.02-1\mu$ are present.

The powder coating should preferably have an average diameter of about $3,\mu$ and a particle size distribution ranging from 5 to $80\mu$.

As to the particle form, it is not always necessary to be of true spherical and pulverized particles having an indeterminate form may likewise be useful in powder coating. However, in the present invention, the powder coating should contain in each particle an anisotropic crystalline palymer having a phase transition piont of $60°-230°$ C., and prederably $80°-230°$ C., thereby attaining both characteristics of blocking resistance and flowability which are usually conflicting each other. The main portion of said powder coating may have the same composition with those of heretofore known powder coatings and therefore, there are no significant change in the film properties of the coating obtained, as compared with those of known powder coatings.

Thus, a very useful powder coating can be provided by the present invention.

Next, the invention shall be more fully explained in connection with dry toner used in the development of static latent images, which is another important application of this invention.

In an electrophotography, an electrostatic printing, and a magnetic recording method, electric latent images are first prepared and then toner is applied to develope the images. Thereafter, the developed images are usually transffered to recording medium as paper and the like, and fixing operation is carried out to obtain storable permanent images.

In orer to effect the fixing of toner images, such energy as heat, pressure and the like is usually employed. At that time, the smaller the required fixing energy, the simpler the fixing device and the smaller the required controlling system. Futhermore, there are additional advantages of reduction in required safty consideration and prolongation of required maintenance interval. However, on the other hand, the dry toner must be well resistive toward mechanical pressure produced at the time of transportation and heating energy generated from exothermic portions in fixing and driving systems, and thus must have the constant developing properties under various use conditions and must maintain the same developing properties even after being stored for a considerable period of time.

Various attempts have been made to effect easy fixting operation. However, in the case of most common fusion-kneaded toners, there was a limit, as a matter of course, in the employment of soft material itself. For solving this question, was invented a capsulated toner.

Various methods have been proposed for the preparation of capsulated toner. For example, in Japanese Patent Publicaton (unexamined) Sho 63-64056, is disclosed a method for preparing a capsulated toner by an interface polycondensation means, the capsule toner comprising a soft material as a core material and a polycondensetion product like polyurea, colorant and the like as a shell material. However, the capsulated toner obtained by this method has a problem such that a considerablly large pressure is required for breaking said capsule because of extremly higher softening point and hardness of the polycondensation shell material. Furthermore, due to undesired variability of shell wall thickness, certain capsules are useless for developing and fixing purposes because of their excessively thicker walls and some other capsules having exessively thinner walls are liable to be easily destroyed prior to their actual use, causing the flow-out of the contained core material and undesired agglomeration of toner particles.

In this proposed method, since the granulation is carried out by dispersing the selected materials in water using a dispersion stabilizer, an additional processing step of removing said dispersion stabilizer is always required. However, when the interface polycondensation is carried out for polyurea shell material, thus formed polyurea may be grafted with a part of dispersion stabilizer used and such grafted co-polymer of hydrophilic nature may be remained on the surface of toner particles in chemically bonded state. Therefore, the toner material obtained by this method is indeed somewhat effective for low-temperature fixing purpose (room temperature pressure fixing), but there are always accompanied with such problem as uneven fixing, paper creases, image quality loss, storage stability loss and the like.

There are also additional methods for the preparation of capsulated toners as spray-drying method, phase separation method and the like as stated in, for example, Japanese Patent Publication (unexamined) Sho 61-88274. However, even in the case of thus formed capusulated toners, the fixing behavior is liable to be often affected by the hardness of the shell material and wall thickness as in the case of previously mentioned capsulated toner of Japanese Patent Publication (unexamined) Sho 63-64056.

Thus, for an ideal toner, well-balanced two conflicting properties, i.e. anti-heat-blocking property and low temperature fixing property, are required in both respects of development and fixing, and various problems are included in heretofore proposed dry toners and preparation thereof. Under the circumstances, has long been wished for a dry toner which can be fixed at a lower temperature without the neccessity for using an excessive heating and high pressure, and is excellent in flowability and is free from caking in a high temperature atmosphere.

The invention has been made as an answer to the abovementioned questions.

The present dry toner can be obtained by either one of the followings.

That is, a method wherein the anisotropic crystalline polymer-containing microparticles are mixed with conventional toner powder and the mixture is stirred well so as to spread the microparticles over the surface of the respective toner particle or strike the microparticles in the surface area of the toner particle in ball-mill: and a method wherein a melt-mixture or an organic solvent solution of toner-constituting raw materials and the present anisotropic crystalline polymer bearing ionic groups is dispersed in water and thus obtained emulsion is filtered and dried. No particular manufacturing devices are required.

Futhermore, thus obtained toner particles each has on its surface or suface layer the present anisotropic crystalline polymer and therefore, are excellent in blocking resistance under room temperature storage conditions. When the surrounding temperature exceeds over the phase transition temperature of said crystalline polymer, melt-viscosity of toner composition suddenly drops to a lower level and therefore, the toner shows an excellent flowability without causing any adverse effects on fixing.

Differing from non-crystalline polymers, the present crystalline polymer is very sensitive to pressure and therefore, it is very easy to obtain a room-temperature pressure fixing type toner.

The ionic groups contained in the molecule of said condensation polymer may fulfil the duties of charge controlling agent, and such ionic groups may be freely designed as desired.

As the constituting materials for the present toner paticles, any of the materials customarily used in the conventional toner compositions may be successfully used except of the anisotropic crystalline polymer. That is, (A) As a base resin, a high molecular weight compound having a softening point of $+40°-120°$ C. may be used, as, for example, polyester resin, polycarbonate resin, epoxy resin, acrylic resin, styrene/acrylic copolymer, low-molecular weight polyethylene,polypropylene, parafin wax and the like;

(B) As colorant, such color pigments or dyestuffs as various carbon blacks, aniline black, naphthol yellow, molybdenium orange, Rhodamine lake, alizarin lake, methyl violet, phthalocyanine blue, nigrosin, methylene blue, Rose-bengale, quinoline yellow, ultramarine blue, chrome yellow and the like, (C) As optional other additives, various known charge controlling agents as metal containing dyestuffs, aluminium chelates, acetyl salicylic acid, chromium complex, nigrosin derivatives, quaternary ammonium salts and the like; release medium as polyethylen wax, polypropylene wax, silicon oil and the like; magnetic powder as iron, cobalt, nickel, magnetite, hematite, ferrite powders and the like; and other functional materials, alumina, silica and the like. One of the preferable preparation methods of the present toner comprises spreading the microparticles of anisotropic crystalline polymer over the surface of conventional toner powder or striking said microparticles in the surface layer of the respective toner particle.

At that time, conventional toner powder is first prepared from the abovementioned raw-materials following the usual procedures. That is, the constituting components (A) to (C) are first heat-melted and kneaded in a kneader as mixer, extruder, heat rolls and the like, the mixture is allowed to cool and thus obtained cooled mass is pulverized in, for example, atomizer, jet-mill and the like and shieved to an appropriate size powder; or the constituting components are dissolved or dispersed in an organic solvent and the solution or dispersion is subjected to spray-drying and then shieving; or a mixture of colorant (or colrant disspersion in an appropriete resin vehicle), radically polymerzable monomers for base resin, polymerization initiator, optional charge controlling agent, wax, magnetic powder and other additives is subjected to suspension polymerization or dispersion polymerization in water or an organic solvent in the presence of dispersion stabilizer. On the other hand, the anisotropic crystalline polymer (A) employed is a polymer capable of forming an anisotropic molten phase, having a number average molecular weight of 600 to 10,000 and a phase transition point of 60° to 180° C and having the structure in which a repecting unit (I) of the formula (I):

$$A-X-B \qquad (I)$$

wherein 100 to 50 mol % of A stands for mesogenic group selected from the group consisting of a polyphenylene in which 2 or more benzene rings are directly connected with each other at their respective para-position, a polyphenylene in which 2 or more benzene rings are mutually connected with each other at the respective para-position through azo, azoxy, ester or transvinylene bond, 2,6-naphthylene and 2,6-anthrylene and their ring-substituted derivatives, the remaining 0 to 50 mol % of A stands for p-phenylene, m-phenylene or trans-1,4-cyclohexylene group; B is a spacer group represented by the formula:

$-(CH_2)_{\overline{n}}$ or the formula:

$-(CH_2CH_2O)_{\overline{m}}CH_2CH_2-$ in which n is an integer of 2 to 20 and m is an integer of 1 to 19; and x represents ester bond, carbonate bond, amide bond, urethane bond or urea bond, and a repeating unit (II) of the formula:

R in which R stands for bivalent to hexavalent hydrocarbon residue having 2 to 12 carbon atoms, which may include up to 4 hydroxyl, sufonic acid, carboxyl, amino, pyridinium or quaternary ammonium groups, are connected in any successive orders and in a weight ratio of (I)/(II)= 99.9/0.1 to 70/30, each other through ester bond, carbonate bond, amide bond, urethane bond or urea bond, and whose end portions are occupied by at least one functional group selected from the group consisting of hydroxyl, carboxyl, sulfonic acid, primary amino, secondary amino, tertiary amino, quaternary ammonium, phyridinium and phosphoric acid groups.

and is used in the form of microparticles having an average grain diameter of $0.02-1\mu$.

The microparticles may include additional resin (B) customarily used for the preparation of toner powder, as acryl resin, styrene resin, styrene-acryl resin, polyester resin and the like, as desired.

Such microparticles may be advantageously prepared by either one of the followingt methods.

1) A method comprising dispersing said anisotropic crystalline polymer(A) or a mixture of said polymer (A) and resin (B) in water in the presence of sufactant and/or water soluble dispersion stabilizer, and after filtering and washing as desired, drying the formed microparticles.

2) A method wherein the crystalline polymer (A) having an ionic group as tertiary amino group, quaternary ammonium group, carboxyl group, sulfonic acid group and the like, is, after neutralized if desired, dispersed in water and thus obtained emulsion is filtered, washed and dried.

3) A method wherein the constituting monomers for the resin (B) are polymerized by means of emulsion polymerization and the like, in the presence of the crystalline polymer (A) having an ionic group as tertiary amino group, quaternary ammonium group, caboxyl group, sulfonic acid group and the like.

Mixing of said toner powder and said microparticles may be advantageously carried out by either one of the following:

(1) A method wherein the toner powder is dispersed in water and thus obtained dispersion is mixed with a separately prepared aqueous dispersion of the microparticles, stirred, filtered and dried.

2) A method wherein the dried toner powder and the microparticles are mixed in a super mixer, Henschel mixer or the like, and 3) A method wherein the dried toner powder and the microparticles are mixed in a hybritizer, ball-mill or the like, thereby striking the microparticles into the surface area of said toner powder.

In either method, can be obtained the present composite particle which is useful as dry toner, and comprises a conventional toner particle on which surface or in which surface layer anisotropic crystalline polymer microporticles are present. The most preferable toner of the present invention comprises composite particles having an average particle diameter of $3-20\mu$, and preferably a paricle size distribution of $4-10\mu$, the respective particle being composed of a conventional toner particle, on which surface or in which surface layer microparticles having an average diameter of $0.02-1\mu$ and each containing 2-100 % by weight of anisotropic crystalline polymer whose phase transition point is $60°-180°$ C. are present. The anisotropic crystalline polymer may preferably have a positive-charging functional group as tertiary amino group, pyridinium group, quatery ammonium group and like or negative-charging functional group as carboxyl group, sulfonic adid group and the like. The present composite particles may be most advantageously prepared by the following method, developed by the inventors and named, for convenience, as emulsification in water method. According to this method, a heat-melt or an organic solvent solution of a mixture of anisotropic crystalline polymer having in its polymer chain or at the end portions of polymer chain an ionic group as sulfonic adid group, carboxyl group, amino group, pyridinium group, quaternary ammonium group and the like and a phase transition temperature of $60°-180°$ C., a base resin having a softening point of $+40°-120°$ C. and a molecular weight of 600 or more, colorant and other optional additives is mechanically dispersed and emulsified in water and thus formed granulesare filtered and dried.

The resinous components of said crystalline polymer and base resin are used, in general, in the weight ratio of 2-60 % of the former to 98-40 % of the latter, and 1-40 parts of colorant are used per 100 parts of the total resin.

These raw materials, i.e. resins, colorant and other additives, are heat-melted together by using a known appropriate device as, for example, extruder, three-roll-mill and the like or dissolved or dispersed in a solvent by using an appropriate means as sand grinder, paint shaker, homogenizer and the like. As the solvent, any of the known solvents may be satisfactorily used. However preference is given to a solvent capable of dissolving the resins and having affinities to both resins and water.

From the operational easiness and economical point of view, preferable solvent should have a boiling point of $50°-170°$ C., and more preferably $80°-140°$ C. In emulsifying said hot-melt or said solution in water, mechanical stirring is used. At that time, one may use, at the same time, a dispersion stabilizer and emulsifier as desired and however, when adopted, since an additional washing is required, it is much preferred not to use such dispersion stabilizer or emulsifer.

Thus obtained toner is excellent in both flowability and blocking resistance. When the tonoer is used for the development of static latent images and especially when an ionic group bearing crystalline polymer is included in the composite particles, uniform charge distribution and excellent images can be obtained therewith.

The toner is also characterized by having a comparatively long life.

The term "softening point" as used herein shall denote the temperature of flow beginning (Tfb) of a resin measured by Koka Shiki Flow Tester (FT-500C, manufactured by Shimazu Corp.) under conditions: load 20 Kgf, orifice length 1 mm orifice diameter 1mm, temperature raising rate $6°$ C./min. The invention shall be now more fully explained in the following Examples Unless otherwise being stated, all parts and % are by weight.

SYNTHETIC EXAMPLE 1

Preparation of anisotropic crystalline polymer having ester bond

Into a reaction vessel fitted with a heating device, a stirrer, a nitrogen gas inlet tube and a fractionating column, were placed 3 moles of 4,4'-diphenyl carboxylic dimethyl ester, 4 moles of 1,9-nonanediol and 0.8 g of dibutyl tin oxide and the mixture was heated under dry nitrogen gas stream to dissolve the same. Next, the content was heated to effect ester exchange reaction at 130° to 230° C., while removing the formed methanol. After maintaining the temperature at 230° C. and collecting 230 ml of methanol, the ester exchange reaction was further continued for 1 hour under 10 mmHg pressure. The reaction mixture was then allowed to cool to 130° C.,added with 2 moles of phthalic anhydride, and reacted at 150° C. for 1 hour to obtain polyester A. Number average molecular weight of said polyester A (polystyrene reduction) was 1850, which was determined by GPC (trichlorobenzene solvent, column temperature 135° C.).

This polyester showed main endothermic peak, measured by using differential scanning calorimeter (DSC) under temperature raising condition of 10° C. per minute, at about 128° C. and main exothermic peak under cooling condition of 10° C. per minute, at about 85° C. Optically anisotropic texture of this polymer was confirmed by the observation under right-angled polarized light, using a heat-staged microscope.

SYNTHETIC EXAMPLE 2

Preparation of anisotropic crystalline polymer having ester bond

Into a reactor, were placed 8 moles of 4,4'-diphenyl caboxylic dimethyl ester, 2 moles of terephthalic dimethyl ester, 11 moles of 1,9-nonanediol and 2,2g of dibutyltin oxide and mixture was heated, under dry nitrogen gas, to solve the charged materials. Next, the mixture was heated at 130°-230° C., while removing the formed methanol, to effect ester exchange reaction. Heating at 230° C was continued until 745 ml of methanol were collected and then the mixture was reacted under 10 mmHg for 1 hour to complete the ester exchange reaction and obtain polyester B. Number average molecular weight (polystyrene reduction, measued by GPC at column temperature 135° C, using trichlorobenzene as solvent) of this polyester B was 6100.

This polyester showed large endothermic peak, measured by using differential scanning calorimeter (DSC) under 10° C./min. temperature raising conditions, at about 125° C., and large exothermic peak, under 10° C./min. cooling conditions, at about 83° C.

Optically anisotropic texture of this polymer was confirmed by the observation under right-angled polarized light, using a heat-staged microscope.

SYNTHETIC EXAMPLE 3

Preparation of anisotropic crystalline polymer bearing urethane bond

Into a reactor, were placed 3 moles of triethylene glycol, 4-moles of 2,6-naphthalene diisooyanate, 275 g of ethylene glycol monoethyl ether and 0.6 g of dibutyl- tin dilaurate and the mixture was heated, under dry nitrogen gas, and reacted at 100° C. for 5 hours.

To this, 2 moles of dimethyl ethanol amine were dropwise and gradually added and the combined was maintained at the same temperature for 3 hours to complete the reaction and obtain polyurethane C. Number average molecular weight (polystyrene reduction, measured by GPC at column temperature 135° C.,using trichlorobenzene as solvent) of this polyurethane C was 1700.

This polyurethane showed large endothermic peak, measured by using differential scanning calorimeter (DSC) under 10° C./min. temperature raising conditions, at about 136° C., and large exothermic peak, under 10° C./min.cooling conditions, at about 90° C.

Optically anisotropic texture of this polymer was confirmed by the observation under right-angled polarized light, using a heat-staged microscope.

SYNTHETIC EXAMPLE 4

Preparation of anisotropic crystalline polymer bearing amide bond

Into a reactor,were placed 4 moles of 4,4'diphenyl carboxylic dimethylester,1 mole of terephthalic dimethyl ester, 6 moles of hexamethylene diamine and 1,4 g of dibutyltin oxide and the mixture was heated, under dry nitrogen gas, to solve the charged materials. Next, the mixture was heated at 130°-230° C., while removing the formed methanol, to effect ester exchange reaction Heating at 230° C. was continued until 375 ml of methanol were collected and then the mixture was reacted under 10 mmHg pressure for 1 hour to complete the ester exchange reaction and obtain polyamide D. Number average molecular weight (polystyrene reduction, measured by GPC at column temperature 135° C., using trichlorobenzene as solvent) of this polamide D was 2800.

This polyamide showed large endothermic peak, measured by using differential scanning calorimeter (DSC) under 10° C./min. temperature raising conditions, at about 143° C., and large exothermic peak, under 10° C./min. cooling conditions, at about 94° C.Optically anisotropic texture of this polymer was confirmed by the observation under right-angled polarized light, using a heat-staged microscope.

SYNTHETIC EXAMPLE 5

Preparation of anisotropic crystalline polymer bearing carbonate bond

Into a similar reaction vessel as used in Synthetic Example 1, were placed 5 moles of 4,4'-dihydroxy biphenyl, 2 moles of 1,6-hexanediol and 1400 g of methylene chloride.

To thus obtained solution, while maintaining the temperature at 15° C., 12 moles of triethylamine were added and then 6 moles of butyleneglycol bischloroformate were gradually and dropwise added. After keeping the combined at 15° C. for 2 hours, the mixture was filtered and methylene chloride solvent was removed off under reduced pressure from thus obtained filtrate to obtain polycarbonate E.From GPC measurement (column temperature 135° C., trichlorobenzene solvent), it was found that number average molecular weight of this polycabonate (polystyrene reduction) was 2400.

SYNTHETIC EXAMPLE 6

Preparation of anisotropic crystalline polymer bearing urea bond

Into a similar reaction vessel as used in Synthetic Example 1, were placed 5 moles of tolidine diisocyanate, 2 moles of p-phenylene diisocyanate, 8 moles of hexamethylene diamine and 860 g of ethyleneglycol monoethylether acetate. The combined was, while maintaining at 50° C. under dry nitrogen gas stream, reacted for 6 hours. To this, 2 moles of trimellitic anhydride and 15g of dimethyl benzylamine were added and the mixture was heated and reacted at 120° C. for 2 hours to obtain polyurea F. From GPC measurement (column temperature 135° C., trichlorobenzene solvent), it was found that number average molecular weight of this polyurea (polystyrene reduction) was 3300. This polyurea F showed large endothermic peak, measured by using differential scanning calorimeter (DSC) under temperature raising condition of 10° C. per minute, at about 119° C. and large exothermic peak under cooling condition of 10° C. per minute, at about 78° C. Optically anisotropic texture of this polymer was confirmed by the observation under right-angled polarized light, using a heat-staged microscope.

SYNTHETIC EXAMPLE 7

Preparation of polyester to be used as binder resin for toner

Into a reaction vessel as used in Synthetic Example 1, were placed 85.5 g of coconut oil, 42.4 g of trimethylolpropane, and 4 g of xylene and ester exchange reaction was carried out at 200° C. In about 1 hour, after confirming that methanol tolerance reached infinite value, the mixture was allowed to cool.

To this, 177.2 g of 1,6-hexanediol, 295 g of isophthalic acid and 14 g of xylene were added, the combined was heated and dehydration condensation was carried out at 210° C.–220° C. At the stage when the acid value of resinous solid reached 20, the reaction was overed to obtain polyester having a number average molecular weight of 1600.

SYNTHETIC EXAMPLE 8

Preparation of acryl resin to be used as binder resin for toner

Into a reaction vessel as used in Synthetic Example 1, were placed 360 g of toluene and 40 g of butyl acetate and the mixture was heated to 100° C. To this, a mixture of 280 g of styrene, 120 g of n-butyl methacrylate and 12 g of azobisisobutyronitrile was dropwise added in 3 hours. After completion of said addition, a solution of 2.5 g azobisisobutyronitrile in 50 g of acetone was dropwise added in 1 hour and the combined was reacted at the same temperature for 3 hours. Thereafter, the solvent was removed off under reduced pressure to obtain styrene-acryl resin having a number average molecular weight of 4500.

SYNTHETIC EXAMPLE 9

Preparation of dispersing agent for dispersion paste

Into a similar reaction vessel as used in Synthetic Example 1, were placed 240 g of propyleneglycol monomethylether and heated to 90° C. To this, a mixture of 302 g of methyl methacrylate, 202 g of n-butyl acrylate, 38 g of dimethylaminoethyl methacrylate, 18g of acrylic acid and 8 g of azobis-isobutyronitrile was dropwise added in 3 hours. After completon of said addition, a solution of 1.2 g of Azobis-isobutyronitrile in 25 g of propyleneglycol monomethylether was dropwise added in 1 hour and the combined was reacted at the same temperature for 4 hours. Number average molecular weight of thus obtained product was 7200.

SYNTHETIC EXAMPLE 10

Preparation of carbon black dispersion paste

Into a stainless steel pot, were placed 50 g of carbon black (Monac 880, manufactured by Cabot Co.), 200 g of dispersing agent obtained in Synthetic Example 9, 115 g of propyleneglycol monomethylether and 100 g of isopropyl alcohol and the mixture was stirred, added with glass bead, stirred in a paint shaker for 1 hour and filtered to obtain a carbon black dispersion paste.

SYNTHETIC EXAMPLE 11

Preparation of colored particles by using a kneading and pulverizing method 340 g of styrene/n-butyl methacrylate copolymer having a number average molecular weight of 6000, 40 g of carbon black (Black Pearls-L, trademark of Cabot Co.) and 12 g of polypropylene was (Biscol 550 P, manufactured by Sanyo Kasei) were heat-melted, kneaded, cooled, pulverized and shieved to obtain black particles having an average diameter of 7μ.

SYNTHETIC EXAMPLE 12

Preparation of colored particles

Styrene: 150 g
n-butyl methacrylate: 50
azobisisobutyronitrile: 8
phthalocyanine blue: 15
helio fast blue: 4 were mixed well for about 10 minutes in a vessel fitted with a high-shearing mixing device as TK Homomixer (manufactured by Tokushu Kogyo K.K.). During said mixing, temperature was raised to and maintained at about 55° C. The abovementioned colorants were uniformly dispersed in styrene-acryl monomers in said mixing. Separately, using TK Homomixer, 2g of polyvinyl alcohol were dispersed in 600g of water and the dispersion was maintained at 70° C. To this, the abovementioned dispersion slurry was added under stirring, and the combined was stirred by means of TK Homomixer at 400 rpm, for 30 minutes.

The reaction mixture was stirred by means of paddle mixer to complete polymerization and the content was washed with water, filtered and dried to obtain blue particles having an average diameter of 8μ.

SYNTHETIC EXAMPLE 13

Preparation of color particles

Into a separable flask fitted with a thermometer, a condenser, a nitrogen gas inlet tube and a stirrer, were placed 13 g of hydroxypropyl cellulose (manufactured by Nihon Soda, HPC-M), 1170 g of isopropyl alcohol, 130 g of 2-methoxyethanol and 19g of grafted carbon (manufactured by Mitsubishi Kasei Kogyo, Graft carbon M-3) and the mixture was heated to 70° C. and dissolved completely. While introducing a nitrogen gas stream, a mixture of 175 g of styrene, 35 g of 2-ethylhexyl acrylate and 7 g of azobisisobutyronitrile was dropwise added in 30 minutes thereto and the combined was reacted at the same temperature for 18 hours. The reaction mass was then washed, dried and pulverized to obtain black powder having an average grain diameter of 6μ.

EXAMPLE 1

80 g of the anisotropic crystalline polymer obtained in Synthetic Example 1, 320 g of polyester obtained in Synthetic Example 7 and 300 g of carbon black dispersion paste obtained in Synthetic Example 10 were stirred at 110° C. Thus obtained mixture was added to a mixed solution of 2800 g of deionized water and 8 g of dimethylethanolamine and the combined was stirred in TK Homomixer for 20 minutes and then gradually allowed to cool under reduced pressure. This was then dried, and filtered to obtain powder having an average grain diameter of 6μ and having a particle size distribution of 65 wt % or more of 5–7,μ diameter. This powder was shieved to obtain powder having an average grain diameter of 3–12μ. Thus obtained powder showed no detectable blocking even when stored at 50° C. for 1 month. This powder was mixed with acryl resin coated ferrite carrier in a weight ratio of 1 : 49 and subjected to blow-off test.

Electrification amount was $-25.4\mu C/g$.

Next, an actual test-chart copying and fixing operations were carried out by using U-BIX-3000 (a copying machine, manufactured by Konica) and a developer containing 3 % of the abovementioned toner (fixing roll temperature 140° C.), and excellent copies with good reproducibility, were obtained.

EXAMPLES 2–6

Various toners were prepared as in Example 1, with the materials shown in Table 1. The characteristics of these toners and image evaluation test results are also shown in Table 1. In the following table, the indicated figures for the compositions are all in grams.

and 2.5 g of dimethyl ethanol amine, and a monomer mixture of 288 g of methyl methacrylate and 72 g of n-butylacrylate in 2 hours. After competion of said addition, the remaining 1/5 volume of the abovementioned mixed solution were added thereto and the combined was maintained at the same temperature for 2 hours to effect reaction. The reaction product was washed, dried and pulverized to obtain micropaticles having an average diameter of 0.15μ.

15 g of said microparticles and 285 g black particles obtained in Synthetic Example 11 were mixed well in Henshel Mixer to obtain the present toner. No blocking was observed even when stored at 50° C. for 1 month.

Thus obtained toner was mixed with ferrite carrier in a weight ratio of 1 : 49 and subjected to blow-off test. Electrification amount was $-12.4\mu C/g$.

Next, an actual test-chart copying and fixing operations were carried out by using U-BIX-3000 copier and a developer containing 3 % of said toner (fixing roll temperature, 140° C.), and excellent copies with good reproducibility were obtained.

EXAMPLE 8

The same procedures as stated in Example 7 were repeated excepting using 24 g of microparticles obtained in Example 7 and 276 g of color particles obtained in Synthetic Example 13 to obtain toner. Electrification amount of this toner was $-17.3\ \mu C/g$.

This toner could be fixed at the heating roll temperature of 140° C. and showed excellent copy-reproducibility. No blocking was observed even when stored the toner at 50° C. for 1 month.

EXAMPLE 9

840 g of deionized water, 36 g of polymer obtained in Synthetic Example 3 and 2.5 g of acetic acid were mixed and melted together at 80° C. To this, 4/5 volume of a polymeriation initiator solution of 3 g of V-50 (pol-

TABLE 1

| | | Example | | | | |
|---|---|---|---|---|---|---|
| | | 2 | 3 | 4 | 5 | 6 |
| polymer of Syn. Example 1 | | 12 | | | 20 | |
| polymer of Syn. Example 2 | | 48 | | | | |
| polymer of Syn. Example 3 | | | 40 | | | |
| polymer of Syn. Example 4 | | | | 100 | | |
| polymer of Syn. Example 5 | | | | | 60 | |
| polymer of Syn. Example 6 | | | | | | 60 |
| polyester of Syn. Example 7 | | 340 | | | 320 | 340 |
| acryl resin of Syn. Ex. 8 | | | 360 | 300 | | |
| paste of Syn. Example 10 | | 300 | 300 | 300 | 300 | 300 |
| dimethyl ethanol amine | | 1.1 | | | 2 | 6.5 |
| acetic acid | | | 2.8 | 4.3 | | |
| polypropylene wax | | 8 | 10 | | 6 | 8 |
| average diameter (μm) | | 7.5 | 9.3 | 8.1 | 7.2 | 6.4 |
| blocking at 50° C., 1 month | | no | no | no | no | no |
| Electrification amount (μc/g) | Toner/acryl resin coated ferrite carrier 1/49 | −16.2 | | | −18.7 | −23.5 |
| | Toner/fluorine resin coated ferrite carrier 2/48 | | +15.6 | +11.8 | | |
| Fixing roll temperature (°C.) | | 140 | 160 | 160 | 140 | 130 |
| image | U-BIX-3000 | good | | | good | good |
| | SF-8100 (Sharp K.K.) | | good | good | | |

EXAMPLE 7

1500 g of deionized water, 32 g of polymer of Synthetic Example 1 and 3 g of dimethyl ethanol amine were mixed together and dissolved at 80° C. To this, were dropwise added 4/5 volume of a mixed solution of 4g of azobiscyano valeric acid, 80 g of deionized water ymerization initiator, manufactured by Wako Jyunyaku K.K.) in 60 g of deionized water and a monomer mixture of 90 g of styrene, 90 g of methyl methacrylate and 120 g of 2-ethyl hexyl methacrylate were dropwise added in 2 hours. Thereafter, the remaining 1/5 volume of the polymerization initiator solution was added and the mixture was maintained at the same temperature for 2 hours to complete the reaction. The reaction mass was washed, dried and pulverized to obtain micropaticles having an average diameter of 0.1μ. 18 g of thus obtained microparticles and 282 g of color particles obtained in Synthetic Example 12 were mixed in Henshel-Mixer to obtain toner. This toner showed no blocking even after storing at 50° C for 1 month.

Thus obtained toner and fluorine resin coated ferrite carrier were mixed together in a weight ratio of 2 : 48 and subjected to blow-off test. Electrification amount was +14.4μC/g. An actual copying and fixing operations were carried out by using SF8100 copier and a developer containing 5% said toner (heat fixing roll temperature 150° C.) and excellent copies were obtained with good reproducibility.

COMPARATIVE EXAMPLE 1

Color particles obtained in Synthetic Examples 11–13 were stored at 50° C. for 1 month. Considerable blockings were observed in every toners.

COMPARATIVE EXAMPLE 2

When the toners of Comparative Example 1 were used in U-BIX3000 and SF-8100 copiers, the effective heat roll temperatures were 190° C. and 180° C., respectively.

SYNTHETIC EXAMPLE 14

Preparation of anisotropic crystalline polymer having ester bond

Into a reaction vessel fitted with a heating device, a stirrer, a nitrgogen gas inlet tube and a fractionating column, were placed 193 parts of 4,4′-diphenyl carboxylic dimethylester (DPCDM), 121 parts of 1,9-nonanediol (1,9ND), 5.5 parts of trimethylol propane (TMP) and 0.5 part of dibutyltin oxide and the mixture was heated under dry nitrogen gas stream to dissolve the same.

Next, the content was heated to 130° C.–230° C., while removing the formed methanol, to effect ester exchange reaction. Heating at 230° C. was continued until 46 ml of methanol were collected and then the mixture was further reacted under reduced pressusre of 10 mmHg for 1 hour to obtain anisotropic crystalline polymer A. Thus obtained polymer had curable functional groups corresponding to hydroxyl value of 32, and a number average molecular weight (polystyrene reduction, measured by GPC using trichlorobenzene solvent and column themperature of 135° C.) of 3500.

This anisotropic crystalline polymer A showed large sharp endothermic peak, measured by using differential scanning calorimeter (DSC) under temperature raising conditions of 10° C. per minute, at about 138° C. and large sharp exothermic peak, under temperature lowering conditions of 10° C. per minute, at about 110° C.

SYNTHETIC EXAMPLE 15

Preparation of anisotropic crystalline polymer having ester bond

Into a reaction vessel fitted with a heating device, a stirrer, a nitrogen gas inlet tube and a fractionating column, were placed 135 parts of 4,4′-diphenyl carboxylic dimethylester (DPCDM), 120 parts of 1,9-nonanediol (1,9-ND) and 0.5 part of dibutyl tin oxide and the mixture was heated under dry nitrogen gas stream to dissolve the same.

Next, the content was heated to 130° C.–230° C., while removing the formed methanol to effect ester exchange reaction.Heating at 230° C. was continued until 32 ml of methanol were collected and then the mixture was further reacted under reduced pressure of 10 mm Hg for 1 hour to obtain anisotropic crystalline polymer B. Thus obtained polymer (B) had curable functional groups having hydroxyl value of 125 and number average molecular weight (polysterene reduction, reasured by GPC using trichlorobenzene solvent and column temperature of 135° C.) of 1000. This anisotropic crystalline polymer B showed large sharp endothemic peak, measured by using Defferential Scanning Calorimeter (DSC) under temperature increasing conditions of 10° C. per minute, at about 127° C., and large sharp exothermic peak, under temperature decreasing conditions of 10° C. per minute, at about 100° C.

SYNTHETIC EXAMPLE 16

Preparation of anisotropic crystalline polymer having ester bond

Into a reaction vessel, 100 parts of the anisotropic crystalline polymer B obtained in Synthetic Example 15 were placed and while keep the same in a molten state at 150° C. under nitrogen gas streame, 29 parts of phthalic anhydride were added and reacted for 30 minutes to obtain anisotropic crystalline polymer C. Thus obtained polymer C had curable functional groups showing a hydroxyl value of O and an acid value of 12.5 and a number average molecular weight (polystyrene reduction), measured by GPC using trichlorobenzene solvent and column temperature of 135° C., was 1300.

When measured by using DSC under conditions of tempetature increasing rate of 10° C. per minute and temperature decreasing rate of 10° C. per minute, it showed large sharp endothermic peak at about 117° C. and large exothermic peak at about 97° C., respectively.

SYNTHETIC EXAMPLE 17

Preparation of acryl resin to be used as binder for powder

Into a similar reaction vessel as used in Synthetic Example 16, 80 parts of xylene were placed and heated to 130° C. To this, a mixture of 25 parts of styrene, 45 parts of methyl methacrylate, 30 parts of glycidyl methacrylate and 2 parts of azobisisobutyronitrile was dropwise added in 3 hours. After completion of said addition, the mixture was maintained at the same temperature for 30 minutes, and added dropwise with a solution of 0.5 part of azobisisobutyronitrile in 5 parts of xylene in 30 minutes. Thereafter, the combined was maintained at the same temperature for 1 hour and the solvent was removed off under reduced pressure to obtain a glycidyl methacrylate containing acryl resin D having a number average molecular weight of 4000.

SYNTHETIC EXAMPLE 18

Preparation of coating use anisotropic crystalline polymer 10 parts of anisotropic crystalline polymer C obtained in Synthetic Example 16 were dissolved in 10 parts of xylene. This solution was gradually added into hot water maintained at 95° C. under vigorous stirring to obtain an emulsion of fine liquid droplets having a diameter of 1μ or less. This emulsion was allowed to cool to room temperatures and the solidified microparticles were separated to obtain anisotropic crystalline polymer microparticles.

SYNTHETIC EXAMPLE 19

Coating use particles prepared by an emulsion polymerization in the presence of anisotropic crystalline polymer surfactant 5 parts of anisotropic crystalline polymer C obtained in Synthetic Example 16 were neutralized with 0.825 part of dimethyl ethanol amine, dissolved in 379 parts of deionized water, and then heated under nitrogen gas stream to 80° C.

To this, (A) solution of 1 part of ammonium persulfate dissolved in 40 parts of deionized water and (B) solution of a mixture of 20 parts of n-butylacrylate and 80 parts of methyl methacrylate were simultaneously and dropwise added in 90 minutes, and therfter, the combined was maintained at 80° C. for 60 minutes and then allowed to cool to room temperature to obtain a milky emulsion The emulsion particles were separated and dried to obtain white powdery particles which were stable at room temperatures.

SYNTHETIC EXAMPLE 20

Preparation of polyester powder coating 40 parts of anisotropic crystalline polymer A obtained in Synthetic Example 14, 20 parts of polyester resin (heating residue 100%, molecular weight 2100, hydroxyl value 112, glass transition temperature 60° C.), an amount of Kreran U1 ( $\epsilon$-caprolactam blocked 1PDI, trademark, Bayer, NCO eqivualent =365) required for giving OH/NCO eqivalent ratio of 1/1, and an amount of dibutyltin dilaurate as curing catalyst which corresponded to 1.0 % by weight of the total solid were taken in Super Mixer (manufactured by Kawada Seisakusho) and pulverized and mixed well. Then, the mixture was transferred to a melt-dispersing machine, Busco Kneader (manufactured by Bus Co.) and dispersed well, which was then pulverized and shieved (150 mesh shieve) to obtain anisotropic crystalline polymer containing polyester powder coating E.

EXAMPLE 10

Preparation of thermosetting type acryl paint, by using kneader 50 parts of anisotropic crystalline polymer A obtained in Synthetic Example 14, 50 parts of acryl resin obtained in Synthetic Example 4 and 15 parts of Deyarn dicarboxylic acid were compounded together. Next, the compound was pulverized and mixed in Super Mixer (manufactured by Kawada Seisakusho) and then dispersed in Busco Kneader.

This was then pulverized and shieved by 150 mesh shieve. Thus obtained powder coating was greatly improved in blocking resistanace as compared with the corresponding powder coating containing no anisotropic crystalline polymer, without causing any decrease in finishing appearance. A durable clear coating was obtained, when baked the coating at 160° C. for 20 minutes.

EXAMPLE 11

Preparation of thermosetting type polyester paint by using kneader 30 parts of anisotropic crystalline polymer A obtained in Synthetic Example 14, 30 parts of polyester resin (heating residue 100 %, molecular weight 2100, hydroxyl value 112, glass transition temperature 60° C.), an amount of Kreran U1 ( $\epsilon$-caprolactam blocked 1PDI, tradewark, Bayer, NCO equivalent =365) required for giving OH/NCO eqivalent ratio of 1/1, an amount of dibutyltin dilaurate which corresponded to 1.0 wt % of the total solid, and 45 parts of titanium dixide were taken in Super Mixer (manufactured by Kawada Seisakusho) and pulverized and mixed well. Then, the mixture was dispersed in Buso kneader (manufactured by Bus Co.) and pulverized and shieved by 150 mesh shieve. Thus obtained powder coating was far improved in blocking resistance than that of the corresponding powder coating containing no anisotropic crystalline polymer, without cousing any undesired decrease in finishing appearance. A durable hard coating was obtained by baking at 230° C. for 10 minutes.

EXAMPLE 12

Preparation of thermosetting polyester paint.

50 parts of anisotropic crystalline polymer A obtained in Synthetic Example 14, 50 parts of polyester resin (heating residue 75%, molecular weight 2100, hydroxyl value 112, glass transition temperature 60° C.) and 20 parts of melamine resin U-128 (heating residue 60%, manufactured by Mitsui Tohatsu) were mixed well This was then dissolved in 50 parts of mixed solvent of xylene and n-butanol at 120° C. and thus obtained solution was placed in, under vigorous stirring, hot water maintained at 90° C. or more. The mixture was then allowed to cool gradually and precipitated solid particles were separated and recovered.

Thus obtained powder coating showed excellent blocking resistance as compared with that of the corresponding powder coating containing no anisotropic crystalline polymer, without causing any decrease in finishing appearance. A durable hard coating was obtained when baked at 230° C. for 10 minutes.

EXAMPLE 13

Preparation of thermophastic type polyester powder coating by using kneader 30 parts of anisotropic crystalline polymer A obtained in Synthetic Example 14, and 30 parts of polyester resin (heating residue 100 %, molecular weight 2100, hydroxyl value 112, glass transition temperature 60° C.) were compounded.

This compound was pulverized and mixed in Super Mixer (manufactured by Kawada Seisakusho) and dispersed in Busco kneader (manufactured by Bus Co.). This was then pulverized and shieved by using 150 mesh shieve.

Thus obtained powder coating was far excellent in blocking resistance as compared with that of the corresponding powder coating containing no anisotropic crystalline polymer, without causing any decrease in finishing appearance.

EXAMPLE 14

5 Preparation of thermosetting type polyester powder coating, using a post-emulsification method 25 parts of anisotropic crystalline polymer obtained in Synthetic Example 15, 25 parts of anisotropic crystalline polymer obtained in Synthetic Example 16, 50 parts of polyester resin (heating residue 75%, molecular weight 2100, hydroxyl value 112, glass transition temperature 60° C.), an amount of Kreran U1 ( $\epsilon$-caprolactam blocked 1PDI, trademark, Bayer, NCO equivalent 365) requied for giving OH/NCO equivalent ratio =1/1, and an amount of dibutyltin dilaurate (as hardening catalyst) which corresponded to 1.0 wt % of the total solid were compounded and dissolved in a mixed solvent of xylene and n-butanol at 120° C. This solution was then placed, under vigorous stirring, in a hot water maintained at 90° C. or more and the combined was gradually cooled to precipitate solidifed particles, which were then separated and recoverd from water medium.

Thus obtained powder coating was excellent in blocking resistance as compared with that of the corresponding powder coating containing no anisotropic crystalline polymer, without causing any decrease in finishing appearance.

A durable clear, hard coating was obtained when baked at 230° C. for 10 minutes.

EXAMPLE 15

Preparation of thermosetting type polyester powder coating by a solvent precipitation method 5 parts of polyester A obtained in Synthetic Example 15 and 100 parts of n-butanol were mixed together and heat-melted at 130° C. This was then allowed to cool to about 90° C., added with 20 parts of powder coating obtained in Synthetic Example 7, and the combened was gradually allowed to cool to precipitate powder coating particles bearing on their respective particle surface, the anisotropic crystalline polymer.

Thus obtained powder coating showed excellent blocking resistance as compared with that of the corresponding powder coating containing no anisotropic crystalline polymer, without causing any derease in finishing appearance. A durable clear hard coating was obtained when baked at 230° C. for 10 minutes.

EXAMPLE 16

Preparation of thermosetting type polyester powder coating, by spreading means

To 100 parts of the powder coating obtained in Synthetic Example 20, were added 10 parts of the microparticles obtained in Synthetic Example 5 and the combined was mixed well to obtain the present powder coating, having an average particle diameter of about 30μ, each particle comprising the powder particle bearing a number of anisotropic crystalline polymer microparticles adhered/spreaded thereupon.

Thus obtained powder coating showed excellent blocking resistance as compared with that of the correstonding powder coating containing no anisotropic crystalline polymer, without causing any decrease in finishing appearance. A durable clear hard coating was obtained when baked at 230° C. for 10 minutes.

EXAMPLE 17

Preparation of thermosetting type polyester powder coating by sprading means

To 100 parts of the powder coating obtained in Synthetic Example 20, were added 10 parts of the microparticles obtained in Synthetic Example 19 and the combined was mixed well to obtain the present powder coating having an average particle diameter of about 30μ, each particle comprising the powder partilcle carrying with a number of emylsion-polymerized microparticles bearing anisotropic crystalline polymer, adheared / speaded on their respective surface.

Thus obtained powder coating showed excellent blocking resistance as compared with that of the corresponding powder coating containing no anisotropic crystalline polymer, without causing any derease in finishing appearance.

A durable, clear, hard coating was obtained when baked at 230° C. for 10 minutes.

EXAMPLE 18

Preparation of thermosetting type polyester powder coating by spray-drying means 10 parts of the anisotropic crystalline polymer B obtained in Synthetic Example 15 and 100 parts of n-butanol were mixed together and heat-melted at 130° C. After cooling to about 90° C., 20 parts of the powder coating obtained in Synthetic Example 20 were placed in and the combined was subjected to spray-drying in nitrogen gas atmosphere.

Thus obtained powder coating, each particle having on the surface a quantity of anisotropic crystalline polymer, showed excellent blocking resistance as compared with that of the corresponding powder coating containing no anisotropic crystalline polymer, without causing any decrease in finishing appearance. A durable, clear, hard coating was obtained when baked at 230° C. for 10 minutes.

COMPARATIVE EXAMPLE 3

Powder coating containing no anisotropic crystalline polymer 60 parts of polyester resin (heating residue 100%, molecular weight 2100, hydroxyl value 112, glass transition temperature 60° C.), an amount of Kreran U1 ( ε-caprolactam blocked 1 PDI, tredemark, Bayer, NCO equivalent 365) required for giving OH/NCO equivalent ratio =1/1, and an amount of dibutyltin dilaurate hardening catalyst which corresponded to 1.0 wt % of the total solid were mixed together and pulverized in Super MIxer (manufactured by Kawada Seisakusho). This was then dispersed in Busco Kneader, pulverized and shieved by using 150 mesh shieve.

Thus obtained powder coating showed inferior blocking resistance, turned to adhered cake during storage and therefore, could not be used as powder coating, after said storage.

COMPARATIVE EXAMPLE 4

Powder coating, prepared by using an excessively larger quantity of anisotropic crystalline polymer 0 5 parts of polyester resin (heating residue 100 %, molecular weight 2100, hydroxyl value 112, glass transition temperature 60° C.), 55 parts of the anisotropic crystalline polymer A obtained in Synthetic Example 14, and an amount of Kreran U1 (ε-caprolactam blocked 1PDI, trademark, Bayer, NCO equivalent 365) required for giving OH/NCO equivalent ratio =1/1, and an amount of dibutyltin dilaurate which corresponded to 1.0 wt % of the total solid were combined together.

This compound was then pulverized and mixed in Super Mixer, dispersed in Busco Kneader, and pulverized and shieved by 150 mesh shieve.

Thus obtained powder coating showed excellent blocking resistance and however, since the cured coating showed rather poor hardness than that of the coating obtained in Example 11, the powder coating could not be taken as fully satisfiable product required at the present days in various technical fields.

What is claimed is:

1. A composite particle comprising 2 to 98% by weight of a base resin and 98 to 2% by weight of an anisotropic crystalline polymer, the former being a high molecular weight polymer having a softening point of −10° to 120° C. and having a number average molecular weight of 600 or more, and the latter being a polymer capable of forming an anisotropic molten phase, having a number average molecular weight of 600 to 10,000 and a phase transition point of 60° to 230° C. and having a structure in which a repeating unit (I) of the formula (I)

$$A-X-B \tag{I}$$

wherein 100 to 50 mol % of A stands for a mesogenic group selected from the group consisting of a polyphenylene in which 2 or more benzene rings are directly connected with each other at their respective para-positions, a polyphenylene in which 2 or more benzene rings are mutually connected with each other at the respective para-positions through an azo, azoxy, ester or transvinylene bond, 2,6-naphthylene and 2,6-anthrylene and their ring-substituted derivatives, the remaining 0 to 50 mol % of A being selected from the groups consisting of a p-phenylene, m-phenylene and trans-1,4-cyclohexylene group; B is a spacer group represented by the formula:

$$-(CH_2)_{\overline{n}}$$

or the formula:

$$-(CH_2CH_2O)_{\overline{m}}CH_2CH_2-$$

in which n is an integer of 2 to 20 and m is an integer of 1 to 19; and X is selected from the group consisting of an ester bond, a carbonate bond, an amide bond, a urethane bond, a urea bond, and a repeating unit of the formula:

$$R \tag{II}$$

wherein R stands for a bivalent to hexavalent hydrocarbon residue having 2 to 12 carbon atoms, which may include up to 4 hydroxyl, sulfonic acid, carboxyl, amino, pyridinium or quaternary ammonium groups, connected to each other, in any successive orders and in a weight ratio of (I)/(II)=99.9/0.1 to 60/40, through an ester bond, a carbonate bond, an amide bond, a urethane bond or a urea bond, and whose end portions are occupied by at least one functional group selected from the group consisting of hydroxyl, carboxyl, sulfonic acid, primary amino, secondary amino, tertiary amino, quaternary ammonium, pyridinium and phosphoric acid groups.

2. A composite particle useful as powder coating comprising
(A) a base resin particle having an average diameter of 1 to 50μ, the base resin having a softening point of −10° to 120° C. and a number average molecular weight of 600 to 100,000 and being selected from the group consisting of a polyester resin, an acryl resin, an epoxy resin and a vinyl chloride resin, and
(B) an anisotropic crystalline polymer having a phase transition temperature of 80° to 230° C. and a number average molecular weight of 600 to 10,000 and having a structure comprising a repeating unit of the formula $$A-X-B \tag{I}$$

wherein 100 to 50 mol % of A stands for a mesogenic group selected from the group consisting of a polyphenylene in which 2 or more benzene rings are directly connected with each other at their respective para-positions, a polyphenylene in which 2 or more benzene rings are mutually connected with each other at the respective para-positions through an azo, azoxy, ester or transvinylene bond, 2,6-naphthylene and 2,6-anthrylene and their ring-substituted derivatives, the remaining 0 to 50 mol % of A stands for a p-phenylene, m-phenylene or trans-1,4-cyclohexylene group; B is a spacer group represented by the formula:

$$-(CH_2)_{\overline{n}}$$

or the formula:

$$-(CH_2CH_2O)_{\overline{m}}CH_2CH_2-$$

in which n is an integer of 2 to 20 and m is an integer of 1 to 19; and X represents an ester bond, a carbonate bond, an amide bond, a urethane bond or a urea bond, and a repeating unit of the formula:

$$R \tag{II}$$

wherein R stands for a bivalent to hexavalent hydrocarbon residue having 2 to 12 carbon atoms, which may include up to 4 hydroxyl, sulfonic acid, carboxyl, amino, pyridinium or quaternary ammonium groups, connected to each other, in any successive orders and in a weight ratio of (I)/(II)=99.9/0.1 to 60/40, through an ester bond, a carbonate bond, an amide bond, a urethane bond or a urea bond, and whose end portions are occupied by at least one functional group selected from the group consisting of hydroxyl, carboxyl, sulfonic acid, primary amino, secondary amino, tertiary amino, quaternary ammonium, pyridinium and phosphoric acid groups, the weight ratio of said base resin to said anisotropic crystalline polymer being 98:2 to 40:60, and the said anisotropic crystalline polymer being present on the surface or in the surface layer of said base resin particle.

3. A composite particle according to claim 2, wherein the anisotropic crystalline polymer is present in the form of micorparticles having an average particle diameter of 0.02 to 1μ.

4. A composite particle useful as a dry toner, comprising (A) a base resin particle having an average diameter of 3 to 20μ, the base resin having a softening point of +40° to 120° C. and a number average molecular weight of 600 or more selected from the group consisting of a polyester resin, a polycarbonate resin, an epoxy resin, an acrylic resin, a styrene/acrylic copolymerized resin, a low molecular weight polyethylene, polypropylene and parafin wax, and containing a colorant, and (B) an anisotropic crystalline polymer having a phase transition temperature of 60° to 180° C. and a number average molecular weight of 600 to 10,000 and having a structure of a repeating unit of the formula (I)

$$A-X-B \tag{I}$$

wherein 100 to 50 mol % of A stands for mesogenic group consisting of a polyphenylene in which 2 or more benzene rings are directly connected with each other at their respective para-positions, a polyphenylene in which 2 or more benzene rings are mutually connected with each other at the respective para-positions through an azo, azoxy, ester or transvinylene bond, 2,6-naphthylene and 2,6-anthyrlene and their ring-substituted derivatives, the remaining 0 to 50 mol % of A being selected from the group consisting of a p-phenylene, a m-phenylene and a trans-1,4-cyclohexylene group; B is a spacer group represented by the formula:

$-(CH_2)_{\overline{n}}$ or the formula:

$-(CH_2CH_2O)_{\overline{m}}CH_2CH_2-$ in which n is an integer of 2 to 20 and m is an integer of 1 to 19; and X is selected from the group consisting of an ester bond, a carbonate bond, an amide bond, a urethane bond, a urea bond, and a repeating unit (II) of the formula:

R (II)

wherein R stands for bivalent to a hexavalent hydrocarbon residue having 2 to 12 carbon atoms, which may include up to 4 hydroxyl, sulfonic acid, carboxyl, amino, pyridinium or quaternary ammonium groups, connected to each other, in any successive orders and in a weight ratio of (I)/(II)=99.9/0.1 to 60/40, through an ester bond, a carbonate bond, an amide bond, a urethane bond or a urea bond, and whose end portions are occupied by at least one functional group selected from the group consisting of hydroxyl, carboxyl, sulfonic acid, primary amino, secondary amino, tertiary amino, quaternary ammonium, pyridinium and phosphoric acid groups, the weight ratio of said base resin to said anisotropic crystalline polymer being 98:2 to 40:60, and the said anisotropic crystalline polymer being present on the surface or in the surface layer of said base resin particle in the form of microparticles having an average diameter of 0.01 to 1μ.

* * * * *